Dec. 14, 1948.                C. C. WATERBURY                2,456,162
                                   MOLD
Filed March 13, 1946                                  3 Sheets-Sheet 1
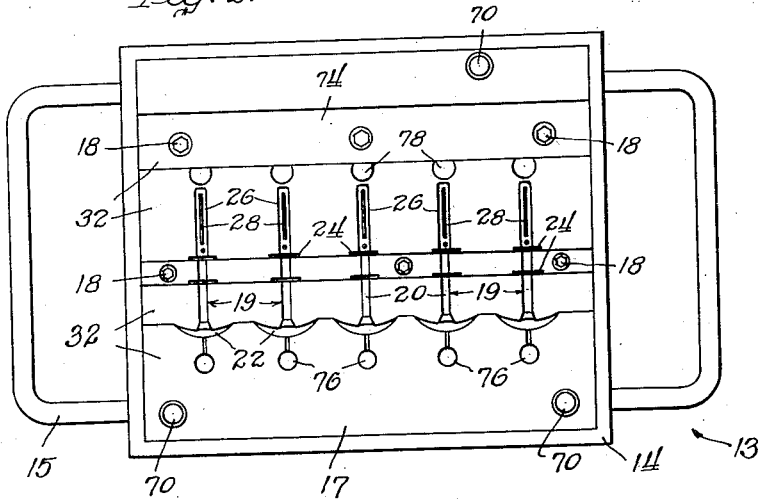
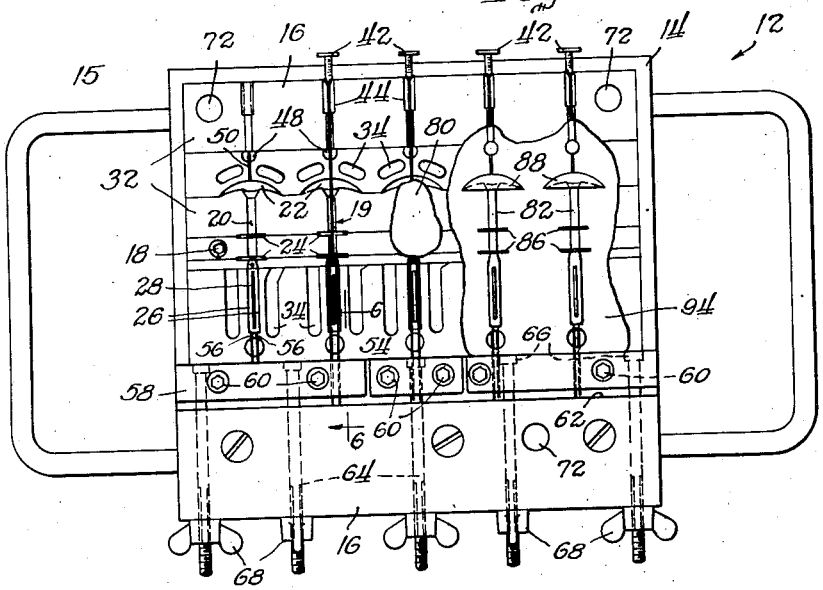
Inventor:
Carl C. Waterbury
By Bair & Freeman
           Attorneys Dec. 14, 1948. C. C. WATERBURY 2,456,162
MOLD
Filed March 13, 1946 3 Sheets-Sheet 2
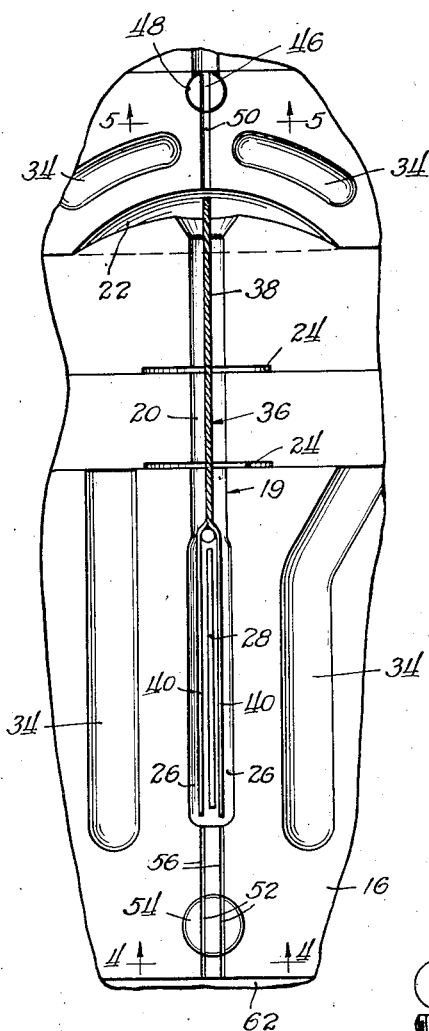
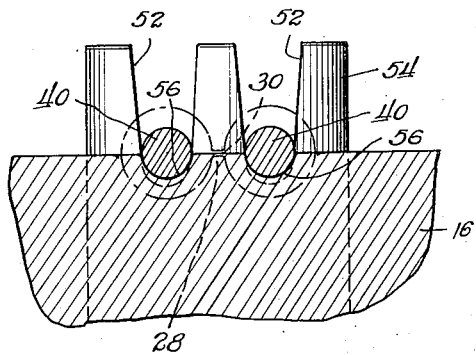
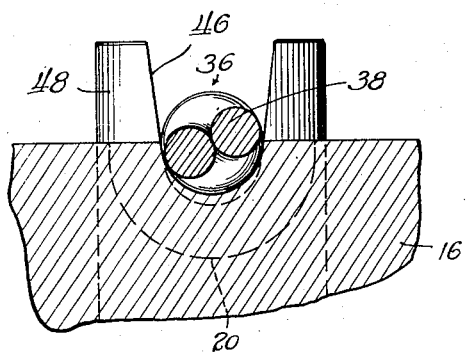
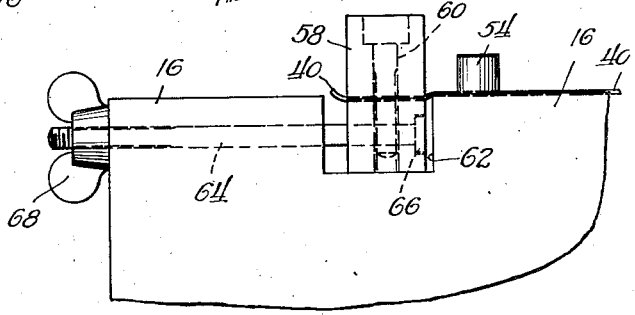
Inventor:
Carl C. Waterbury.
By Bair & Freeman
Attorneys Dec. 14, 1948.  C. C. WATERBURY  2,456,162
MOLD
Filed March 13, 1946  3 Sheets-Sheet 3
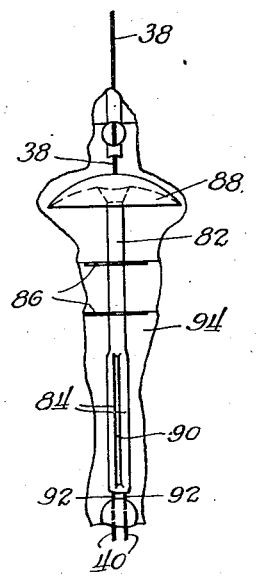
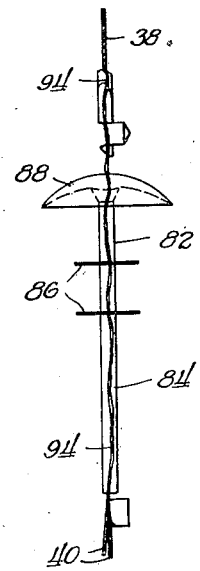
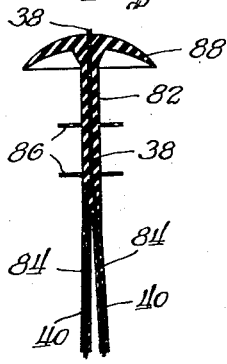
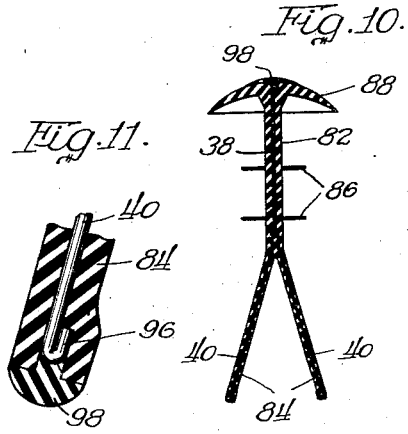
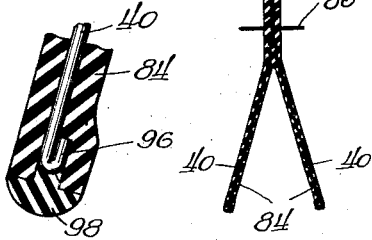
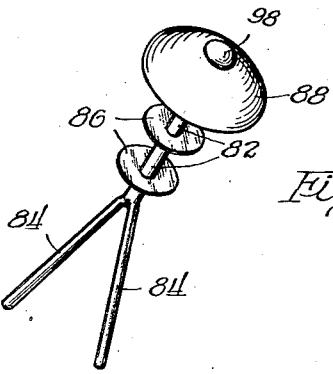
Inventor:
Carl C. Waterbury.
By Bair & Freeman
Attorneys Patented Dec. 14, 1948

2,456,162

UNITED STATES PATENT OFFICE 2,456,162

MOLD

Carl C. Waterbury, Chicago, Ill., assignor to Diaphragm & Chemical Company, Chicago, Ill., a corporation of Illinois Application March 13, 1946, Serial No. 654,165

5 Claims. (Cl. 18—42)

1

My present invention relates to a mold for making pessaries. The pessaries made by the mold of the present invention are of the uterine type, and adapted for use in medical treatment, such as in the treatment of pathological conditions.

More specifically the present invention is directed to a mold for making a pessary of the self-retaining type, comprising a body of pliable, resilient material, having an elongated stem and a button attached to one end thereof, together with a resilient reinforcing member in the stem to furnish a certain amount of rigidity.

In my co-pending application, Serial No. 563,828, filed November 17, 1944, now Patent No. 2,422,377, I disclose a novel pessary and a method of making it. In making the device there disclosed, relatively rigid members are utilized in forming the pessary, and these rigid members are later removed and resilient reinforcing members are inserted for finishing the device. In the present invention I have accomplished a decided improvement wherein the original member used in production of the device forms the ultimate resilient, reinforcing member in the finished article. The general construction and purpose of the pessary having been fully set forth in my said co-pending application, no detail reference thereto is deemed necessary.

One of the objects of the invention, therefore, is to provide an improved mold for making a pessary of the type above referred to in which a relatively rigid member is used in producing the device and which member becomes a resilient, reinforcing member in the finished article.

A still further object of the invention is to provide a mold for molding a flexible material onto a novel reinforcing member in such a manner that the flexible material conforms to the reinforcing member.

Another object is the provision of a mold for forming the device above referred to in such a manner that the excess material of the article, as molded, can be trimmed by hand by a simple process.

A further object of the invention is the provision of an improved mold for making a pessary having a main stem portion and a button at one end thereof, and in which a reinforcing member is permanently molded therein and extends the full length of the device.

Other objects and advantages of this invention will be apparent from the following description, taken in connection with the accompanying drawings, in which:

Figure 1 is a plan view of the face of the mold

2 base, showing different stages in the formation of a pessary;

Figure 2 is a view of the face of the mold cover;

Figure 3 is an enlarged plan view of a single cavity in the mold base with a reinforcing member in place therein;

Figure 4 is a sectional view taken on line 4—4 of Figure 3;

Figure 5 is a sectional view taken on line 5—5 of Figure 3;

Figure 6 is a sectional view taken on line 6—6 of Figure 1;

Figure 7 is an elevational view of the article after it is taken from the mold, and before it is trimmed and finished;

Figure 8 is a side view of the article as shown in Figure 7;

Figure 9 is a vertical sectional view of the article after the waste material has been removed and the extended ends of the reinforcing member cut off;

Figure 10 is a view similar to Figure 9 showing the exposed ends of the reinforcing members turned in, the ends of the finished article sealed, and the leg portions spread apart;

Figure 11 is an enlarged sectional view of the end of a leg portion of the finished article showing the manner in which the reinforcing member is crimped and sealed; and Figure 12 is a perspective view of the finished article.

Referring in detail to the drawings, Figure 1 shows a mold base 12, and Figure 2 the mold cover 13 to be fitted on the mold base, for forming the pessary of the present invention. In reference to both the mold base 12 and the cover 13, similar reference numerals are applied where the parts are similar and cooperate to form the article. Each part consists of a frame structure 14 provided with convenient handles 15. Mounted on the frame 12 is an insert 16, and fitted in the cover 13 is a similar insert 17 secured in place in the respective frames 14 by suitable screws 18 driven flush with or below the faces of the inserts to permit the mold parts to fit tightly together. The cavities for forming the article are indicated at 19 of which a plurality are provided in the mold in parallel relationship across the mold. Each cavity consists of a main length 20 being of elongated formation and of quite narrow width for forming the stem of the article. At one end of the main cavity is a large cavity 22 of convexo-concave formation for forming a button or head on the article. This cavity 22 is of considerable transverse dimension with respect to the width of the stem cavity 20 of the main cavity. Similarly, two additional cavities 24 are formed midway between the ends of the main cavity 19 and extend transversely of the main cavity. These cavities 24 are of lesser transverse dimension than the cavity 22 and are of slight dimension longitudinally of the main cavity.

The end of the stem cavity 20, opposite the head cavity 22, as indicated at 26, is of greater transverse dimension than the remaining portion of said stem cavity. A rib 28 extends upwardly from the bottom of the cavity portion 26 and reduces in tapering cross section toward the parting face of the mold with the free edge 30 of said rib terminating slightly below the surface of the mold face, so that when the two mold parts are together, the edges 30 of the ribs 28 are separated only a slight distance apart.

It will be noted that the inserts 16 and 17 are made of a plurality of segments 32 to facilitate forming the transverse cavities 22 and 24. The segments 32 are carefully shaped to fit together, and are then placed into the frames 14 and secured therein by the screws 18.

Additional cavities 34 are provided in the faces of the inserts 16 and 17 on either side of the main cavity 19 and at both ends thereof. When the material, such as latex, is placed in position in the mold for forming the article in the main cavity 19, the flash or overflow material flows into the overflow cavities 34. These overflow cavities 34 permit accurate and complete fitting together of the mold parts. This feature prevents the overflow material or flash from flowing indiscriminately between the mold parts. Without these overflow cavities 34 greater care would need to be taken in estimating the exact amount of material needed for each article.

The reinforcing member, referred to in the introduction, is put into place in the mold in the forming process of the article. This reinforcing member is shown generally at 36 and consists of a separate strand of wire folded back upon itself with the legs thereof twisted together for an intermediate portion of their length, as indicated at 38, and the free ends or leg portions being separable, as indicated at 40. Each reinforcing member 36 is secured in place in the mold cavity by means of a pin 42 which is inserted through the loop formed at the closed end of the twisted portion 38 of the reinforcing member 36, and the pin then inserted into a hole in the vertical edge of the insert 16 of the mold base 12. The main body 38 of the reinforcing member 36 is then extended across the face of the mold base 12 and extends through an elongated cavity 44 which is an extension of the main cavity 19 which extends beyond the cavity 22. It is then seated in a shallow slot 46 in a supporting projection 48 extending upwardly from the face of the mold bore. A shallow groove 50 extends from the projection 48 to the cavity 22 into which the reinforcing member 36 is seated for approximately one-half its thickness. The reinforcing member 36 is then extended through the main cavity 19, and the main body 38 of the reinforcing member 36 terminates at the adjacent end of the rib 28 where the individual strands or leg portions 40 of the reinforcing member 36 continue, one on each side of the rib 28. The individual leg portions 40 are then extended into notches 52 formed in another supporting projection 54, extending upwardly beyond the face of the mold base 12, and positioned beyond the end of the main cavity. The face of the mold 12 is provided with shallow grooves 56, between the end of the cavity 19 and the supporting projection 54, similarly to groove 50. The free ends of the individual leg portions 40 are then threaded through an anchor block 58 which is formed of two cooperating blocks, the free ends of the leg portions 40 being positioned between the set of blocks. The individual blocks of the anchor blocks 58 are secured tightly together by means of screws 60 for holding the free ends of the leg portions 40 securely in place. The anchor blocks 58 are positioned in grooves 62 extending across the face of the mold base 12 so that the meeting line of the elements of the anchor block 58 is slightly below the surface of the mold face, as indicated in Figure 6. Bolts 64 with enlarged heads 66 are inserted through the anchor blocks 58 and through the insert 16 and provided with wing nuts 68 for drawing the anchor blocks to the left as shown in Figure 6, for drawing the reinforcing members 36 taut.

From Figures 4 and 5 it will be seen how the reinforcing member is positioned at approximately the longitudinal median line of the cavity 19. In the case of the supporting projection 48, the bottom of the slot 46 is positioned below the face of the mold base 12 to such an extent that the reinforcing member 36 is positioned with its longitudinal center line approximately flush with the face of the mold base. Likewise with reference to the supporting projection 54, the slots 52 are cut to such a depth that their bottoms are positioned below the face of the mold base 12 so that the longitudinal center lines of the individual leg portions 40 of the reinforcing member 36 are also approximately flush with the face of the mold base. However, in the case of the projection 54, the extent to which the slots are cut below the face of the mold base is less than the depth of the slots 46 of the projection 48, since only the thickness of the individual leg portions of said reinforcing members is involved. In carrying out this feature, the shallow grooves 50 and 56 formed in the face of the mold base 12, are provided so that the reinforcing member 36 will assume the proper position in the cavity 19. The various sections of the cavity 19 in the cover 13 are approximately shaped to cooperate with the corresponding cavities in the mold base 12, so that a complete cavity is formed around the reinforcing member 36 when it is in place as described above, when the two mold parts are connected together. By tightening up the wing nuts 68, the anchor blocks 58 serve to retain the reinforcing members 36 taut when the material for forming the articles is put in place in the mold.

The mold cover 13 is provided with pins 70 which fit into corresponding holes 72 in the mold base 12 when the cover is fitted on the base. Also, the face of the one segment indicated at 74 in the mold cover 13 terminates below the face of the cover to provide for the anchor blocks 58 which extend upwardly beyond the face of the mold base 12.

The mold cover 13 is also provided with depressions 76 and 78 into which the projections 48 and 54, respectively, project. The depressions 76 and 78 are slightly larger than the projections 48 and 54.

For forming the article, the reinforcing member 36 is placed in position as described above, and then a mass of material, as indicated at 80, is placed on the cavity 19 in approximately the position shown in Figure 1, where it is estimated that a similar amount of material will spread in either direction along the cavity. This material is of high-grade rubber and is commonly termed latex. When it is placed in position for forming the article, it is in a pliable condition and in its final normal consistency at ordinary temperatures. The view of Figure 1 shows, for purpose of illustration, the various steps in forming the article; for instance, the first cavity at the extreme left is shown empty, the next one with the reinforcing member in position therein, the next one with the reinforcing member in position and a mass of material ready to be molded, and finally the last two with the molded articles. The molded articles shown in the last two cavities are, of course, unfinished and untrimmed, the process of forming the final article not being completed.

After a mass of material as indicated by the numeral 80 is placed on each of the cavities, the mold cover 13 is placed on the mold base 12. The complete mold is then put in a suitable press where intense pressure is applied and suitable heating elements are applied to each mold part. This pressure and heat then plasticizes the latex material, causing it to flow through the cavities. The reinforcing elements 36 being taut, the material 80, when it softens, is forced into cavities 19 and entirely surrounds the reinforcing member 36, and also surrounds the separated individual leg portions 40 of said member. The material 80 being soft passes into the lower cavities 19 in the mold base without depressing the reinforcing members 36 to any appreciable extent due to the taut condition of the reinforcing members 36, as above described, whereby, when the mold parts are together, a uniform thickness of the material is applied to the reinforcing member 36 completely around it. The overflow cavities 34 receive the excess material or flash, making it unnecessary to estimate accurately the exact amount of material necessary for each article, a condition which would be more likely if it were not for the overflow cavities 34. The depressions 76 and 78 being larger than the corresponding projections 48 and 54, enable the material to pass through the spaces therebetween permitting material to flow outwardly in each direction along the length of the main cavity 19, whereby if the overflow material fills the overflow cavities 34, any additional excess can flow along the extended ends of the main cavities 19.

After an appropriate length of time the article is properly formed, and vulcanized to the shape of the mold cavity. Then the molded articles are removed and are in the form shown in Figures 7 and 8. The finished article then comprises a main stem 82 of elongated formation, and having individual leg portions 84 at one end thereof. It also has formed thereon two relatively thin flexible disks 86 intermediate the ends of the article which are formed in the cavity 24, and a button 88 at the end opposite the legs 84. The button 88 is bell-shaped, or convexo-concave and has considerable transverse extent. The purpose of the particular shapes of the disks 86 and the button 88 is described in my co-pending application above referred to. It will be understood that the particular forms of these elements do not have a direct bearing on the mold of the present invention. The shapes of the mold cavities may be varied without departing from the scope of the invention. It will be noted that the leg portions 84 are slightly divided, being formed in the sections 26 of the cavity 19 and separated by the ribs 28. The edges 30 of the ribs 28 in both the mold base 12 and the mold cover 13, are spaced a short distance apart, leaving a thin film 90 of material between the leg portions 84. A portion 92 is formed in the extreme end of the cavity 19, belond the end of the ribs 28. The overflow material from the main cavity 19 spreads between the mold faces somewhat and this material is indicated at 94 in Figures 1, 7 and 8.

In finishing the article, the excess material 94 is trimmed off and the ends of the reinforcing member 36 are cut off at a point slightly beyond the outer extremity of the article at each end thereof as indicated in Figure 9. These extending ends of the reinforcing member 36 are then turned back upon said member so that the end is within the interior of the ends of the article, such as seen at 96 in Figure 11. The open ends of the article, both on the button 88 and the leg portions 84, are then sealed with a quantity of latex material as indicated at 98. If desired, the ends of the reinforcing member 36 may be cut off slightly inwardly of the ends of the article without the doubling back feature, and the ends of the article sealed with latex. The material 90 between the leg portions 84 is severed, as is the section 92 at the ends of the leg portions, and the leg portions 84 spread apart as shown in Figures 10 and 12. This step is preferably performed before sealing the ends of the article. It will be understood that the individual leg portions 40 of the reinforcing member will tend to yieldingly maintain the legs 84 in spaced-apart relation, and the twisted portion 38 will serve to provide a relatively rigid reinforcement for the stem 82.

Figure 12 shows the article as it is finally completed.

Some changes may be made in the details of the construction and arrangement of the parts of the device embodying the present invention, without departing from the real spirit and purpose thereof, and it is my intention to cover by my claims any modified forms of structure or use of mechanical equivalents which may be reasonably included within their scope.

I claim as my invention:

1. A mold comprising, a mold base and a mold cover adapted to be fitted and secured together, the base and cover each having a cavity formed therein and arranged to have their open sides meet when the base and cover are fitted together, the mold being adapted for the reception of a wire having a main body with separated leg portions formed at one end thereof, supporting means for positioning the main body of said wire substantially centrally of the cavities, supporting means for positioning the separated leg portions in spaced substantially parallel relation in and on opposite sides of the central longitudinal axis of said cavities, there being a projection extending from the bottom of each cavity and extending toward the open side thereof and positioned to define separate cavities for the leg portions of the wire when the wire is in position in said cavities, and means for securing the base and cover together.

2. A mold comprising a mold base and a mold cover adapted to be fitted and secured together, the base and cover each having an elongated cavity formed therein, the cavities being of cooperating shapes and having their open sides meeting when the base and cover are fitted together, a projection on one of the mold parts adjacent one end of the cavities, the other mold part having a depression for insertion of said projection when the parts are fitted together, said projection having a wire receiving portion formed therein for positioning a wire substantially centrally of said cavities when the base and cover are fitted together, adjustable tensioning means mounted in said one mold part adjacent said projection, said tensioning means being adapted to grip said wire and tension the wire on adjustment of said tensioning means, and means for securing the base and cover together.

3. A mold comprising, a mold base and a mold cover adapted to be fitted and secured together, the base and cover each having an elongated cavity formed therein, the cavities being of cooperating shapes and having their open sides meeting when the base and cover are fitted together, supporting projections carried on the base extending therefrom toward the cover, and positioned longitudinally beyond each end of the cavity, said supporting projections having wire receiving portions formed therein for positioning a wire substantially centrally of said cavities when the base and cover are secured together, securing means spaced beyond one of said projections and adapted for securing one end of a wire at a point below the wire receiving portion of the adjacent projection, adjustable tensioning means spaced beyond the other projection and adapted to grip the opposite end of said wire at a point below the wire receiving portion of the adjacent projection, said tensioning means being adapted to draw said wire taut upon adjustment of said tensioning means, and means for securing the base and cover together.

4. A mold comprising, a mold base and a mold cover adapted to be fitted and secured together, the base and cover each having a cavity formed therein and arranged to have their open sides meet when the base and cover are fitted together, the mold being adapted for the reception of a wire having a main body with separated leg portions formed at one end thereof, first supporting means mounted on the base adjacent one end of the cavities and having a wire receiving portion for positioning the main body of said wire substantially centrally of the cavities, securing means adjacent said first supporting means for securing one end of said wire, second supporting means mounted on the base adjacent the opposite end of the cavities and having spaced wire receiving portions for positioning the leg portions of said wire substantially centrally of the cavities and in laterally spaced relation, securing means adjacent said second supporting means adapted for securing the leg portions of said wire in laterally spaced position, and means for securing the base and cover together.

5. A mold comprising, a mold base and a mold cover adapted to be fitted and secured together, the base and cover each having a cavity formed therein and arranged to have their open sides meet when the base and cover are fitted together, the mold being adapted for the reception of a wire having a main body with separated leg portions formed at one end thereof, supporting means on said mold base for positioning said wire substantially centrally of the cavities, securing means adjacent one end of the cavities for securing one end of said wire, said mold base having a groove formed therein adjacent the opposite end of said cavities, a pair of blocks in said groove and movable longitudinally of the cavities, said blocks adapted to receive the opposite end of said wire between them, means for securing said blocks together in gripping relation to said wire, screw means in said mold base operably connected with said blocks for moving them in said groove and drawing said wire taut, and means for securing the base and cover together.

CARL C. WATERBURY.

REFERENCES CITED

The following references are of record in the file of this patent:

UNITED STATES PATENTS

| Number | Name | Date |
| --- | --- | --- |
| 215,231 | Manly | May 13, 1879 |
| 1,186,554 | Crisenberry | June 13, 1916 |
| 1,625,449 | Bohn et al. | Apr. 19, 1927 |
| 1,982,001 | Haas | Nov. 27, 1934 |
| 2,242,117 | English et al. | May 13, 1941 |
| 2,294,589 | Waterbury | Sept. 1, 1942 |
| 2,363,900 | Pugh | Nov. 28, 1944 |
| 2,408,149 | Miller et al. | Sept. 24, 1946 |

FOREIGN PATENTS

| Number | Country | Date |
| --- | --- | --- |
| 7,477 | Great Britain | Apr. 6, 1895 |